(12) United States Patent
McMullen et al.

(10) Patent No.: US 8,487,762 B1
(45) Date of Patent: Jul. 16, 2013

(54) USING ABNORMAL MOBILE STATION GATHERING TO TRIGGER SECURITY MEASURES

(75) Inventors: Michael P. McMullen, Leawood, KS (US); Rodney D. Nelson, Overland Park, KS (US); John R. Schuler, Sarasota, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 250 days.

(21) Appl. No.: 12/339,917

(22) Filed: Dec. 19, 2008

(51) Int. Cl.
*G08B 13/00* (2006.01)

(52) U.S. Cl.
USPC ........ 340/541; 340/539.1; 348/143; 348/152; 348/153; 348/154; 348/155

(58) Field of Classification Search
USPC ................ 340/541, 539.1; 348/143, 152–155
See application file for complete search history.

(56) References Cited

U.S. PATENT DOCUMENTS

| 7,181,225 | B1 | 2/2007 | Moton, Jr. et al. |
| 2003/0038878 | A1 | 2/2003 | Lee et al. |
| 2007/0182818 | A1* | 8/2007 | Buehler ........................ 348/143 |
| 2007/0285270 | A1* | 12/2007 | Gunn et al. ................ 340/693.6 |
| 2008/0084473 | A1 | 4/2008 | Romanowich |

OTHER PUBLICATIONS

James W. Davis, Mark A. Keck, "Modeling Pedestrian Behavior and Detecting Event Anomalies Using a Seasonal Kalman Filter," OSU Dept. of Computer Science and Engineering Technical Report pp. 1-8 (2005).
Dvd Talk Forum—Chicago considering huge surveillance camera network "CreateSpace DVD on Demand" forum.dvdtalk.com (2007).
Vidient Systems, Inc., "Vidient Announces Smartcatch Analytics 3.0, Newest Version of Sophisticated Surveillance Software Built into new Family of Video Analytics Networking Solutions and Available as a Server-Based Product," (2007).
Vidient Systems, Inc., Vidient SmartCatch Intelligent Video Router 2400 Production Sheet (2007).
Vidient Systems, Inc., Vidient SmartCatch Analytics 3.0 Product Sheet (2007).

* cited by examiner

*Primary Examiner* — Tai T Nguyen
*Assistant Examiner* — Ojiako Nwugo

(57) ABSTRACT

A server may detect a threshold number of mobile stations (e.g., total mobile stations or mobile stations belonging to a predefined group) currently located at an area, such as by determining that a number of mobile stations currently located at an area is greater than a desired maximum number of mobile stations or less than a desired minimum number of mobile stations. The threshold number may be determined based on a typical number of mobile stations located at the area. In response to detecting the threshold number of mobile stations, the server may obtain data recorded by surveillance equipment located at the area (including data recorded by mobile stations temporarily acting as surveillance equipment,) which data represents activity at the area. To obtain the data, the server may instruct the surveillance equipment to begin recording data. The server may then output the received data for receipt by a user.

18 Claims, 3 Drawing Sheets

USING ABNORMAL MOBILE STATION GATHERING TO TRIGGER SECURITY MEASURES

BACKGROUND

In today's world, safety and security are of great concern to both individuals and organizations worldwide. In this respect, many individuals and organizations now employ surveillance equipment, such as cameras and/or microphones, to monitor the activity of people and things at various locations throughout the world. For example, a large corporation may employ surveillance equipment throughout its premises to monitor for unwanted activity such as intrusion, theft, violence, escape, and/or damage. As another example, a government agency may employ surveillance equipment in various public areas of interest for unwanted activity such crime, terrorism, and/or other threats to public safety and security. Government agencies may also be able to monitor for unwanted activity by tapping telephones, such as cell phones, thus transforming those telephones into another type of surveillance equipment. As a result of monitoring activity via surveillance equipment, individuals and/or organizations may thus be able to improve safety and security worldwide.

As surveillance equipment becomes more pervasive, however, problems may arise. For example, as individuals and/or organizations employ surveillance equipment at an increasing number of different locations, it may become difficult for those individuals and/or organizations to devote the appropriate amount of attention to the surveillance data recorded at each of those locations, which may negatively impact the safety or security at those locations. As another example, as individuals and/or organizations employ additional surveillance equipment and record additional surveillance data, those individuals and/or organizations may need to invest in additional data storage that can be both costly and space-consuming. As yet another example, as individuals and/or organizations increasingly monitor surveillance equipment remotely via a network, network bandwidth can become an issue both in terms of cost and availability. Accordingly, an improved method and system of monitoring activity is desired.

OVERVIEW

Disclosed herein is a method of monitoring activity at a given area, which may be served by a given access network. Unless clearly indicated by the context, different examples described herein can be used together.

The method may include (a) detecting a threshold number of mobile stations located at a given area and (b) in response to detecting the threshold number of mobile stations located at a given area, obtaining data recorded by surveillance equipment located at the given area, where the data represents activity at the given area.

The surveillance equipment and the data recorded thereby may take various forms. In one example, the surveillance equipment may include a digital video camera and the data may include digital video. In another example, the surveillance equipment may include a microphone and the data may include audio. In yet another example, the surveillance equipment may include one or more mobile stations located at the given area that are temporarily acting as surveillance equipment. In a further example, the data recorded by the surveillance equipment include data that was previously recorded and stored by the surveillance equipment and/or real-time data.

The threshold number and the act of detecting the threshold number of mobile stations located at a given area may take various forms. In one example, the threshold number may represent a desired maximum number of mobile stations located at the given area, and detecting the threshold number of mobile stations located at a given area may include (a) determining a number of mobile stations currently located at a given area, (b) determining that the number of mobile stations currently located at the given area is greater than the threshold number. In another example, the threshold number may represent a desired minimum number of mobile stations located at the given area, and detecting the threshold number of mobile stations located at a given area may include (a) determining a number of mobile stations currently located at a given area, (b) determining that the number of mobile stations currently located at the given area is less than the threshold number. In either example, the threshold number may be determined based on historical data indicating a typical number of mobile stations located at the given area, either at any time or during a particular time period. Further, the act of detecting a threshold number of mobile stations located at a given area may include detecting a threshold number of total mobile stations that are located at the given area and/or detecting a threshold number of mobile stations belonging to a predefined group (e.g., mobile stations associated with criminals) that are located in the given area.

The act of obtaining data recorded by surveillance equipment located at the given area may take various forms. For example, obtaining data recorded by surveillance equipment located at the given area may include sending a request for data recorded by the surveillance equipment, and as a result of sending the request, receiving data recorded by the surveillance equipment. As another example, obtaining data recorded by surveillance equipment located at the given area may include instructing the surveillance equipment to begin recording data.

The method may additionally include outputting the obtained data for receipt by a user (e.g., a surveillance operator) and/or alerting a law enforcement agency in response to determining that the number of mobile stations exceeds the predefined threshold.

Also disclosed herein is a server that includes (a) a communication interface for communicating with an access network and surveillance equipment located at a given area, (b) a processor, (c) data storage, and (d) program instructions stored in the data storage and executable by the processor for carrying out the exemplary method described above. The server may additionally include a user interface for outputting the obtained data.

The server's data storage may include various data that the server may use to carry out the method described above. For example, the server's data storage may include data defining the given area, data indicating entities in the access network that serve the given area, and/or data indicating surveillance equipment located at the given area. As another example, the server's data storage may include data indicating a number of mobile stations located in the given area, such as data indicating a typical number of mobile stations located in the given area, data indicating a threshold number of mobile stations located in the given area, and/or data indicating a number of mobile stations currently located in the given area.

These as well as other aspects and advantages will become apparent to those of ordinary skill in the art by reading the following detailed description, with reference where appropriate to the accompanying drawings.

DETAILED DESCRIPTION

Figure 1:
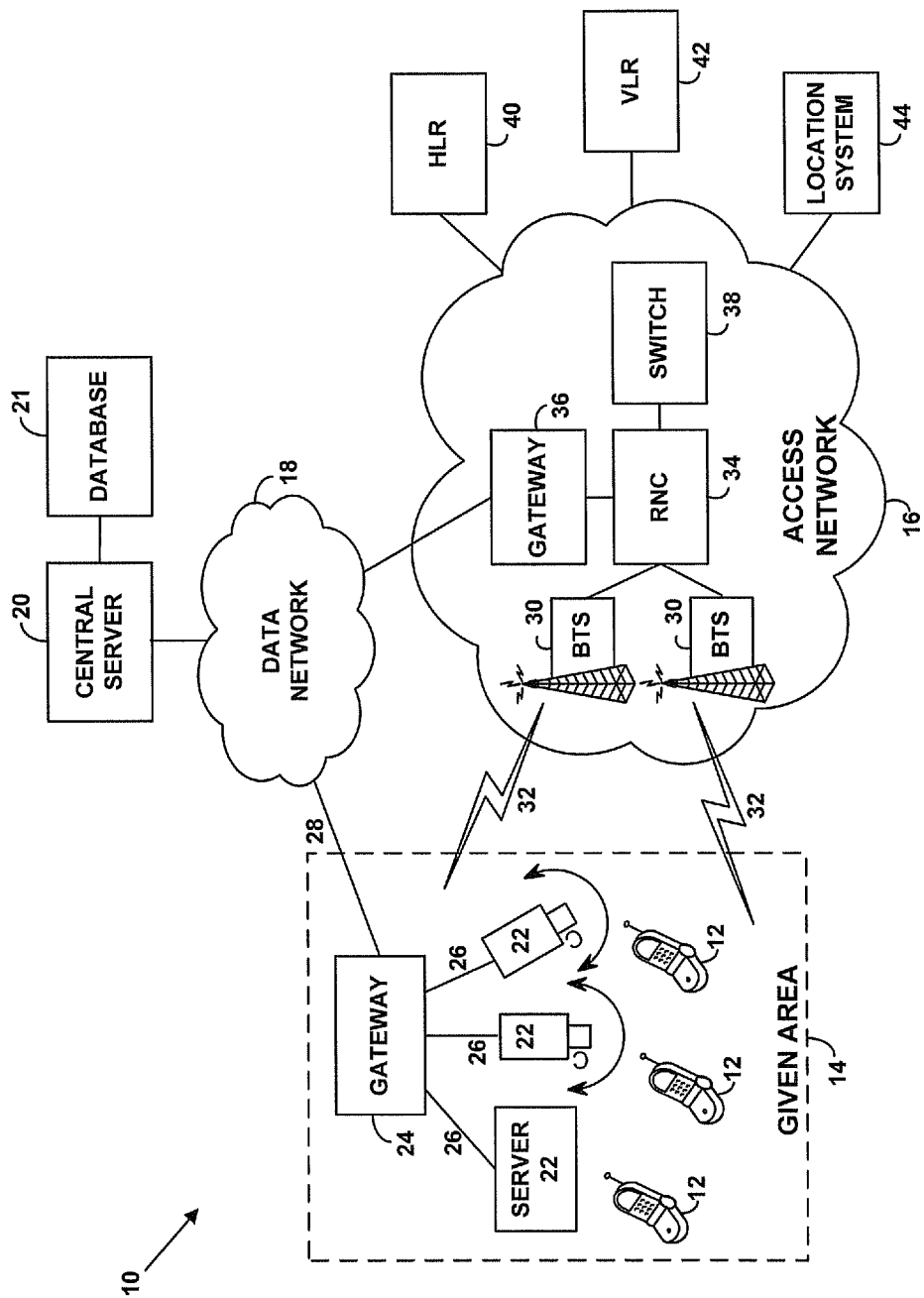
FIG. 1 is a simplified block diagram of a communication system in which an exemplary method can be implemented.

Referring to the drawings, FIG. 1 is a simplified block diagram of a communication system 10 in which an exemplary method can be implemented. As shown, the system 10 may include a plurality of mobile stations 12 located at a given area 14, an access network 16, a data network 18, and a central server 20 sitting as a node on the data network 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

The mobile stations 12 may include any devices capable of wirelessly communicating with the access network 16. As examples, the mobile stations 12 may include cellular telephones, smartphones, personal digital assistants (PDAs), tablet PCs, personal navigation devices (PNDs), personal media players (PMPs), wirelessly-equipped digital cameras, and/or wireless transponders for instance.

The given area 14 may be any area in which mobile stations 12 may be located and activity may be monitored via surveillance equipment. In this respect, the given area 14 may take a variety of forms. For example, the given area 14 may be a may be a privately-owned location, such as a home, an office building, a piece of land, etc. As another example, the given area 14 may be a public location, such as a school, a public park, a busy street, an intersection of streets, a city bus, etc. As yet another example, the given area 14 may be a larger area that encompasses both private and public locations, such as a town, a city, and/or a wireless coverage area. Many other examples of given areas 14 exist as well.

As shown in FIG. 1, the given area 14 will preferably have located therein surveillance equipment 22 that facilitates monitoring of activity at the given area 14 and a gateway 24 that facilitates communication between the surveillance equipment 22 and the data network 18. The given area 14 may include other devices as well, such as such as computers, telephones, and/or output devices (not shown) for instance. In this respect, the devices of the given area 14, including the surveillance equipment 22 and the gateway 24, may be connected together in a local area network (LAN).

As described above, the surveillance equipment 22 located at the given area 14 facilitates monitoring of activity at the given area 14. In this respect, the surveillance equipment 22 may function to capture activity at the given area 14 and record data that represents that activity, such as video data and/or audio data. Additionally, the surveillance equipment 22 may function to process the data, such as by performing analog-to-digital conversion, compression, and/or protocol conversion. Additionally yet, the surveillance equipment 22 may function to send the data, with or without processing, to other entities in the system 10, such as other surveillance equipment 22, the gateway 24, and/or an entity coupled to the data network 18 and/or the access network 16. The surveillance equipment 22 may perform other functions as well, some of which may be described below with respect to the exemplary surveillance equipment types.

The surveillance equipment 22 may be located at various places throughout the given area 14, and may include various different devices. As shown, the surveillance equipment 22 may include one or more video cameras that function to capture activity at the given area 14 as video data. Each of the one or more video cameras may include a lens, an imager (e.g., a charge-coupled device (CCD) or complimentary metal oxide semiconductor (CMOS) sensor), a recorder, and/or an internal storage medium (e.g., flash memory, videotape). Preferably, the one or more video cameras will record the video data in a digital format, such as 5:1-compression Digital Video (DV), Motion Pictures Experts Group (MPEP) (e.g., MPEG-2, MPEG-4), and/or uncompressed digital video. Alternatively, the one or more video cameras may record the video data in an analog format, in which case the one or more video cameras may be connected to additional components (e.g., a video capture card or a digital video recorder (DVR)) that convert the video content from an analog format to a digital format. In a preferred example, the video camera(s) will be IP closed-circuit television (CCTV) cameras, but other examples are possible as well.

The surveillance equipment 22 may also include one or more still cameras that function to capture activity at the given area 14 in the form of still image data. Similar to video cameras, each of the one or more digital still cameras may include a lens, an imager (e.g., a CCD or CMOS sensor), a recorder, and/or an internal storage medium (e.g., flash memory). Preferably, the one or more still camera will record the still image data in a digital format, such as Tagged Image File Format (TIFF), Joint Photographic Experts Group (JPEG), and/or RAW. Alternatively, the one or more still cameras may record the still image data in an analog format and/or on photographic film.

Additionally, the surveillance equipment 22 may include one or more microphones that function to capture activity at the given area 14 in the form of audio data. In this respect, the one or more microphones may take a variety of forms. For example, the one or more microphones may include stand-alone microphones located at the given area 14. As another example, the one or more microphones may include microphones embedded within video cameras located at the given area 14. Other examples of microphones are possible as well. The microphone(s) may record the audio data in either an analog format or a digital format.

Additionally yet, the surveillance equipment 22 may include one or more data storage devices that function to store the data recorded by the other surveillance equipment 22. In this respect, the data storage device(s) will preferably be coupled to other surveillance equipment 22, such that the data storage device(s) may receive and store the data recorded by the other surveillance equipment 22. The data storage device(s) may take a variety of forms. As examples, the one or more data storage devices may include a storage server (as shown), an external disk drive or disk array, a personal computer, a DVR, a video server, a tape drive or library, an optical drive or jukebox, and/or any other device capable of receiving and storing data.

Further, the surveillance equipment 22 may include one or more servers that perform various administrative functions with respect to the other surveillance equipment 22. For example, the surveillance equipment 22 may include a server that receives data recorded by other surveillance equipment 22 and then processes that data, such as by performing analog-to-digital conversion (e.g., a video server). As another example, the surveillance equipment 22 may include a server that receives data recorded by the other surveillance equipment 22 and then outputs that data for receipt by a user (e.g., a surveillance operator), such as by displaying the data on a video monitor for instance. As yet another example, the surveillance equipment 22 may include a server that controls the other surveillance equipment 22, such as by triggering the other surveillance equipment 22 on and off, adjusting positioning of the surveillance equipment 22, and/or adjusting settings of the surveillance equipment 22 for instance. In this respect, the server may perform these control functions in response to a directive by a user and/or some other entity. Other examples are possible as well. In any case, the one or more servers may either be stand-alone devices or may be integrated together with other surveillance equipment 22.

Still further, as described in more detail below, the surveillance equipment 22 may include one or more mobile stations 12 located at the given area 14 that are temporarily acting as surveillance equipment 22. In this respect, a mobile station 12 acting as surveillance equipment 22 may function to capture activity at the given area 14 and record data that represents that activity via the mobile station's user interface. For example, a mobile station 12 acting as surveillance equipment 22 may capture activity at the given area 14 in the form of digital video data, analog video data, digital audio data, and/or analog audio data. Other examples are possible as well. Preferably, a mobile station 12 acting as surveillance equipment 22 will capture the activity at the given area 14 without providing any notice to a user of the mobile station 12.

As described above, the gateway 24 facilitates communication between the surveillance equipment 22 and the data network 18. In this respect, the gateway 24 will preferably be capable of converting between communication formats employed by the surveillance equipment 22 and communication formats employed by the data network 18. In one example, the gateway 24 may be a stand-alone device, such as a router. As another example, the gateway 24 may be integrated together with other surveillance equipment 22, such as a data storage entity and/or a server.

As shown, the gateway 24 may couple to the surveillance equipment 22 via links 26, which may include any wireline and/or wireless link that can carry communications between a surveillance equipment entity 22 and the gateway 24. (Although FIG. 1 depicts the gateway 24 coupling to each surveillance equipment entity 22 directly via a single link 26, it should be understood that the gateway may also couple to a surveillance equipment entity indirectly via multiple links 26 and an intermediate surveillance equipment entity 22.) For example, the links 22 may be twisted-pair cables, coaxial cables, and/or optical fiber cables that carry communications compliant with an Ethernet protocol, an analog video standard (e.g., composite video, s-video, component video, etc.), a digital video standard (e.g., Serial Digital Interface (SDI), High Definition Multimedia Interface (HDMI), Digital Video Interface (DVI), etc.), and/or a serial bus standard (e.g., Firewire, USB 2.0, etc.) for instance. As yet another example, the links 22 may be wireless air interface links that carry communications compliant with cellular protocols (e.g., CDMA, TDMA, WiMAX, GSM, GRPS, UMTS, EDGE, LTE, etc.), Wi-Fi protocols (e.g., 802.11x), and/or wireless personal area network (WPAN) protocols (e.g., Bluetooth, UWB, etc.). Other examples are possible as well.

The gateway 24 may then couple to the data network 18 via a communication link 28. This communication link 28, which may be referred to as a "backhaul" link, may be any wireline and/or wireless link that can carry communications between the gateway 24 at the given area 14 and the data network 18. As an example, the communication link 28 may be a twisted-pair cable, a coaxial cable, and/or an optical fiber cable that functions as a T1/E1 link and/or a SONET/SDH link. As another example, the communication link 28 may be a wireless air interface link that functions as microwave radio link (e.g., WiMAX, LMDS, etc.) and/or a satellite link. Other examples are possible as well, including the possibility that the communication link 28 includes multiple physical links that are networked together. The communication link 28 will preferably carry communications between the gateway 24 and the data network 18 according to an Internet Protocol (IP) protocol in combination with the User Datagram Protocol (UDP) and/or the Transmission Control Protocol (TCP).

The data network 18 may take a variety of different forms. In a preferred example, the data network 18 will include a packet-switched network that facilitates packet-based communication between the and among various entities, devices, and/or networks, including the entities, devices, and/or networks of the system 10 (e.g., between the central server 20 and either the access network 16 or the surveillance equipment 22). In this respect, the packet-switched data network 18 may include some combination of personal area networks (PANs), local area networks (LANs), metropolitan area networks (MANs), and/or wide area networks (WANs), and will preferably include at least a wireless carrier's core packet network and/or the Internet. The packet-switched data network 18 will preferably route packets based on an IP protocol in combination with the UDP protocol and/or the TCP protocol. In this respect, the packet-switched data network 18 will preferably be capable of carrying data encapsulated using various application layer protocols, including media streaming protocols such as the real-time streaming protocol (RTSP), the real-time transport protocol (RTP), and/or the RTP control protocol (RTCP). Many other examples of network configurations and transmission protocols are possible as well.

As shown, the access network 16 may include a plurality of base transceiver stations (BTSs) 30 located throughout a geographical area. (Although FIG. 1 depicts the access network 16 as including two BTSs, it should be understood that the access network 16 may include more than two BTSs). The BTSs 30 may each be any entity that facilitates communication between mobile stations 12 and the access network 16. In this respect, the BTSs 30 may each provide RF-radiation patterns that define one or more air interfaces 32 over which the mobile stations 12 may communicate with the access network 16. For example, each BTS 30 may provide omnidirectional RF-radiation patterns that define a single air interface 32. Alternatively, each BTS 30 may provide directional RF-radiation patterns that define multiple air interfaces 32.

Each of the one or more air interfaces 32 of a given BTS 30 may define a corresponding wireless coverage area of the given BTS 30. For example, if the given BTS 30 radiates to provide a single air interface 32, then the given BTS 30 may serve a single wireless coverage area (e.g., a cell). Alternatively, if the given BTS 30 radiates to provide multiple air interfaces 32, the given BTS 30 may serve multiple wireless coverage areas (e.g., sectors). The coverage areas of the BTSs 30 may collectively define the coverage area of the access network 16.

The air interfaces 32 may carry communications between the access network 16 and the mobile stations 12 according to any of a variety of protocols. For example, the air interfaces 32 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 32 may also be divided into a plurality of channels. For example, each air interface 32 may include forward-link channels, such as pilot channels, sync channels, paging channels, and/or forward-traffic channels, for carrying forward-link communications from the access network 16 to the mobile stations 12. As another example, each air interface 32 may include reverse-link channels, such as access channels and reverse-traffic channels, for carrying reverse-link communications from the mobile stations 12 to the access network 16.

Each BTS 30 of the access network 16 may then couple to a radio network controller (RNC) 34 (also known as a base station controller (BSC)), which may function to communicate with each BTS 30 and control aspects of the BTSs 30 as well as aspects of the air-interface communication with the mobile stations 12. (Although FIG. 1 depicts the access network 16 as including one RNC 34, it should be understood that the access network 16 may include more than one RNC 34, in which case each RNC 34 may couple to a subset of the BTSs 30 in the access network 16. Further, although the BTSs 30 and the RNC 34 are depicted as separate entities, it should be understood that the RNC 34 and one or more BTSs 30 may be incorporated into a single entity). As one example, the RNC 34 may control assignment of air-interface traffic channels to mobile stations 12. As another example, the RNC 34 may control aspects of a given mobile station 12 switching between coverage areas of the access network 16. As yet another example, the RNC 34 may facilitate communications between BTSs 30. Many other examples are possible as well.

The RNC 34 may then couple to a gateway 36, such as a packet data serving node (PDSN), which may provide connectivity with the data network 18. In this respect, the RNC 34 may additionally include a packet control function ("PCF") for controlling packet-data communications. Further, the RNC 34 may couple to a switch 38, such as a mobile switching enter (MSC), which may provide connectivity with a circuit-switched network (e.g., the public switched telephone network (PSTN)) and/or a signaling network (e.g., a Signaling System #7 (SS7) network). Accordingly, with this general arrangement, the access network 16 may facilitate communications between two mobile stations 12 in the access network 16, as well as communications between a given mobile station 12 and a communication device coupled to one of the transport networks (e.g., the data network 18).

The access network 16 may further include or have access to entities that function to determine, maintain, and/or report the location of mobile stations 12 in the access network 16. For example, as shown, the access network 16 may include or have access to a home location register (HLR) 40 that maintains, for each wireless carrier subscriber, a profile that includes an identifier of the subscriber's mobile station 12 (e.g., MIN, IMSI, UATI, etc.) and an indication of the mobile station's location (e.g., an indication of the coverage area in which the mobile station 12 is located and/or the RNC 34 serving the mobile station 12). As another example, the access network 16 may include or have access to one or more visitor location registers (VLRs) 42, each of which supports a particular coverage area of the access network 16 (e.g., a sector, cell, or group of cells) and maintains, for each wireless carrier subscriber located in that particular coverage area, a copy of the wireless carrier subscriber's profile.

As yet another example, the access network 16 may include or have access to a location system 44 that functions to determine the location of mobile stations 12 in the access network 16. The location system 44 may include a variety of entities, including a front-end location server, a location gateway (e.g., a mobile positioning center (MPC)), a location engine (e.g., a position determining entity (PDE)), and/or a base station almanac (BSA) for instance. Further, the location system 44 may use a variety of methods for determining the location of the mobile stations 12, including obtaining an indication of the location directly from the mobile stations themselves and/or calculating the location of the mobile stations 12 based on data obtained from the access network 16, the mobile stations 12, and/or satellite-based systems for instance. In this respect, the location system 44 and/or the mobile stations 12 may employ any location-determination technique now known or later developed, including cell/sector identification, enhanced forward link trilateration (EFLT), advanced forward link trilateration (AFLT), angle of arrival (AOA), time difference of arrival (TDOA), enhanced observed time difference (E-OTD), global positioning system (GPS), and/or assisted-GPS for instance. Other examples are possible as well.

The central server 20 may take various forms, and in general may be any programmable computer capable of carry out the exemplary method described herein. In one example, the central server 20 may literally be a "server" class computer. In another example, the central server may be a personal computer or some other programmable computing device arranged to function as the central server 20. In either case, the central server 20 may also include a user interface that facilitates user interaction with central server 20.

As shown, the central server 20 may sit as a node on the data network 18. In this respect, the central server 20 may communicate with entities at the given area 14, such as the surveillance equipment 22, over a path that includes the data network 18, the communication link 28, and the gateway 24. Additionally, the central server 20 may communicate with the access network 16 and the entities therein, such as the RNC 34, the MSC 38, the HLR 40, the VLR 42, and/or the location system 44, over a path that includes the data network 18 and the gateway 36. (Although not shown, the central server 20 may alternatively communicate with the HLR 40, the VLR 42, and/or the location system 44 over a path that does not include the access network 16). Additionally yet, the central server 20 may communicate with mobile stations 12 over a path that includes the data network 18 and the access network 16.

Within this general arrangement, the central server 20 may carry out an exemplary method of monitoring activity in various geographical areas, including the given area 14. In particular, the central server 20 may work with the access network entities to monitor a number of mobile stations 12 located at the given area 14 (e.g., total mobile stations 12 or mobile stations 12 belonging to a predefined group). While monitoring the number of mobile stations 12 located at the given area 14, the central server 20 may detect a threshold number of mobile stations 12 located at the given area 14. For example, the central server 20 may determine that the number of mobile stations 12 currently located at the given area 14 is greater than a threshold number of mobile stations 12 located at the given area 14. In this respect, the central server 20 can identify an abnormally large number of mobile stations 12 at the given area 14, which may be an indication of unwanted activity at the given area 14 such as intrusion, violence, and/or damage for instance. As another example, the central server 20 may determine that the number of mobile stations 12 currently located at the given area 14 is less than a threshold number of mobile stations 12 located at the given area 14. In this respect, the central server 20 can identify an abnormally small number of mobile stations 12 at the given area 14, which may also be an indication of unwanted activity at the given area 14 such as escape and/or theft for instance.

If the central server 20 detects a threshold number of mobile stations 12 located at the given area 14 at any point, the central server 20 may then begin obtaining data recorded by the surveillance equipment 22 located at the given area 14, such as by requesting and receiving data recorded by the surveillance equipment 22 and/or instructing previously-idle surveillance equipment 22 to begin recording data at the given area 14. In turn, the central server 20 may output the data for receipt by user, thus enabling the user to monitor past or current activity at the given area 14. Additionally, if the central server 20 detects a threshold number of mobile stations 12 located at the given area 14 at any point, the central server 20 may also take other security measures, such as alerting law enforcement agencies associated with the given area 14.

Advantageously, the exemplary method described herein may facilitate improved surveillance at the given area 14. In particular, the exemplary method may use current location-based techniques to quickly identify and monitor unwanted activity at the given area 14, which may in turn allow individuals and/or organizations to learn of and react to the unwanted activity more quickly. Further, the exemplary method may enable surveillance equipment to record data at the given area 14 only when unwanted activity is identified, which may in turn allow individuals and/or organizations to save on data storage and/or network bandwidth. Other benefits may exist as well.

To carry out the exemplary method, the central server 20 will preferably maintain or have access to a database 21 that stores data for areas in which activity may be monitored (i.e., "areas of interest"), such as the given area 14. (While the database 21 is depicted as a single database, it should be understood that the database 21 may take the form of multiple databases). In this respect, the areas of interest may take various forms, and may be defined based on a variety of different criteria. For example, the areas of interest may be defined based on the access network's wireless coverage areas, in which case each area of interest may be a sector, a cell, and/or a grouping of sectors/cells for instance. As another example, the areas of interest may be defined based on input from an individual and/or organization interested in monitoring activity in a particular area. As still another example, the areas of interest may be defined based on historical data indicating areas in which unwanted activity is more likely to occur. Other examples are possible as well.

The data related to the areas of interest may also take a variety of forms, and may be input, generated, and/or updated by a user, the central server 20, and/or some other entity. In one aspect, the data related to the areas of interest may include data defining the areas of interest. For example, the data may include an identifier of each area of interest, such as a user-generated identifier (e.g., "area #1"), a geographic identifier (e.g., a city name, a street address, etc.), and/or a coverage area identifier (e.g., a BSID or cell/sector ID) for instance. As another example, the data may include data indicating a location of each area of interest, such as geographic coordinates (e.g., latitude and longitude). Other examples are possible as well.

In another aspect, the data related to the areas of interest may include data indicating the access network entities serving each area of interest. For example, the data may include an identifier of each BTS 30, RNC 34, gateway 36, switch 38, HLR 40, VLR 42, and/or location system 44 serving each area of interest. As another example, the data may include an indication of each coverage area being served by these access network entities, such as an identifier of each coverage area (e.g., cell/sector ID) and/or an indication of a location of each coverage area (e.g., a centroid, geographic coordinates of the coverage area's boundaries, etc.). Other examples are possible as well.

In still another aspect, the data related to the areas of interest may include data defining the surveillance equipment 22 located at each area of interest. For example, the data defining the surveillance equipment 22 may include an identifier of each surveillance equipment entity 22 located at each area of interest. As another example, the data defining the surveillance equipment 22 may include an indication of a type of each surveillance equipment entity 22 located at each area of interest. As yet another example, the data defining the surveillance equipment 22 may include data indicating recording and/or communication formats of each surveillance equipment entity 22 located at each area of interest. As still another example, the data defining the surveillance equipment 22 may include an indication of data storage capabilities of each surveillance equipment entity 22 located at each area of interest. As a further example, the data defining the surveillance equipment 22 may include data defining the configuration of the surveillance equipment 22 at each area of interest. As still a further example, the data defining the surveillance equipment 22 may include data indicating the operating status of each surveillance equipment entity 22 located at each area of interest, such as whether the surveillance equipment 22 is on or off and/or whether the surveillance equipment 22 is currently recording data or idle. Other examples are possible as well.

In a further aspect, the data related to the areas of interest may include data indicating a number of mobile stations 12 located in each area of interest, which the central server 20 may use to determine whether there is an abnormally large gathering of mobile stations 14 at the given area 14. Preferably, the data indicating a number of mobile stations 12 located in each area of interest will include data indicating a number of total mobile stations 12 located in each area of interest. Additionally or alternatively, the data indicating a number of mobile stations 12 located in each area of interest may include data indicating a number of mobile stations 12 belonging to a predefined group that are located in each area of interest. In this respect, the data indicating a number of mobile stations 12 located in each area of interest may additionally include data defining one or more predefined groups of mobile stations 12, such as a group of mobile stations 12 associated with criminals (e.g., people with a criminal record and/or people suspected of committing a crime). This data defining the one or more predefined groups of mobile stations 12 may be input by a user and/or may be generated by the central server 20 based on data indicating the characteristics of the predefined group. For instance, the central server 20 may generate data defining a predefined group of mobile stations 12 associated with criminals by referencing data identifying criminals and subscriber profiles stored in the HLR 40.

In one example, the data indicating a number of mobile stations 12 located in each area of interest may include data indicating a number of mobile stations 12 currently located in each area of interest, such as a number of total mobile stations 12 currently located in each area of interest and/or a number of mobile stations 12 belonging to a predefined group that are currently located in each area of interest. In this respect, for each area of interest, the data may include a numerical value that reflects a number of mobile stations 12 currently located in the area, an identifier of each mobile station 12 currently located in the area, and/or an indication of a location of each mobile station 12 currently located in the area. The data indicating a number of mobile stations 12 currently located in each area of interest may take other forms as well. Preferably, the central server 20 will work together with access network entities to generate and/or update the data indicating a number of mobile stations 12 currently located at the areas of interest, as described in more detail below.

In another example, the data indicating a number of mobile stations 12 located in each area of interest may include historical data indicating a typical number of mobile stations 12 located in each area of interest, such as a typical number of total mobile stations 12 located in each area of interest and/or a typical number of mobile stations 12 belonging to a predefined group that are located in each area of interest. The historical data may include data indicating a number of mobile stations 12 currently located in the areas of interest that is now out-of-date due to an update in the number of mobile stations 12 currently located in the areas of interest (i.e., data indicating the number of mobile stations 12 previously located in the areas of interest). In this respect, when updating the data indicating a number of mobile stations 12 currently located in the areas of interest, the central server 20 may keep the data indicating the number of mobile stations 12 previously located in the areas of interest as the historical data. As such, for each area of interest, the historical data may include a numerical value that reflects numbers of mobile stations 12 previously located in the area, identifiers of mobile stations 12 previously located in the area, and/or indications of a location of the mobile stations 12 previously located in the area.

Preferably, the central server 20 will also generate historical data based on the data indicating the number of mobile stations 12 previously and/or currently located in the area, such as a numerical value that reflects a typical number of mobile stations 12 located in the area and/or an identifier of each mobile station 12 previously and/or currently located in the area along with an indication of the time period(s) during which each mobile station 12 was located in the area. In this respect, for each area of interest, the central server 20 will preferably generate historical data indicating a typical number of mobile stations 12 located in the area at any time, such as by calculating a running average number of mobile stations 12 located in the area over a lifetime of monitoring activity in the area. Additionally or alternatively, for each area of interest, the central server 20 may generate historical data indicating a typical number of mobile stations 12 located in the area during one or more particular time periods, such as by calculating a first average number of mobile stations 12 located in the area during a first time period (e.g., weekdays) and a second average number of mobile stations 12 located in the area during a second time period (e.g., weekends). In this respect, the historical data indicating a typical number of mobile stations 12 located in each area of interest may include data defining one or more particular time periods. The historical data indicating a typical number of mobile stations 12 located in each area of interest may take other forms as well.

In yet another example, the data indicating a number of mobile stations 12 located in each area of interest may include data indicating a threshold number of mobile stations 12 located in each area of interest that represents a desired maximum and/or minimum number of mobile stations 12 located in each area of interest, such as a threshold number of total mobile stations 12 located in each area of interest and/or a threshold number of mobile stations 12 belonging to a predefined group that are located in each area of interest. In this respect, for each area of interest, the data will preferably include one or more threshold numbers that represent a desired maximum and/or minimum number of mobile stations 12 located in the area. The data indicating the threshold number of mobile stations 12 located in each area of interest may take other forms as well.

Preferably, the central server 20 will generate the one or more threshold numbers of mobile stations 12 located in each area of interest based on the historical data indicating a typical number of mobile stations 12 located in each area of interest. In particular, for each area of interest, the central server 20 may increase or decrease a numerical value reflecting a typical number of mobile stations 12 located in the area by a predefined amount (e.g., 10% of the numerical value), and the central server 20 may then use the increased or decreased value as a threshold number. In this respect, for each area of interest, the one or more threshold numbers of mobile stations 12 located in the area may include a threshold number of mobile stations 12 located in the area at any time and/or a threshold number of mobile stations 12 located in the area during a particular time period. Other techniques for generating the data indicating a threshold number of mobile stations 12 located in each area of interest may exist as well.

Figure 2:
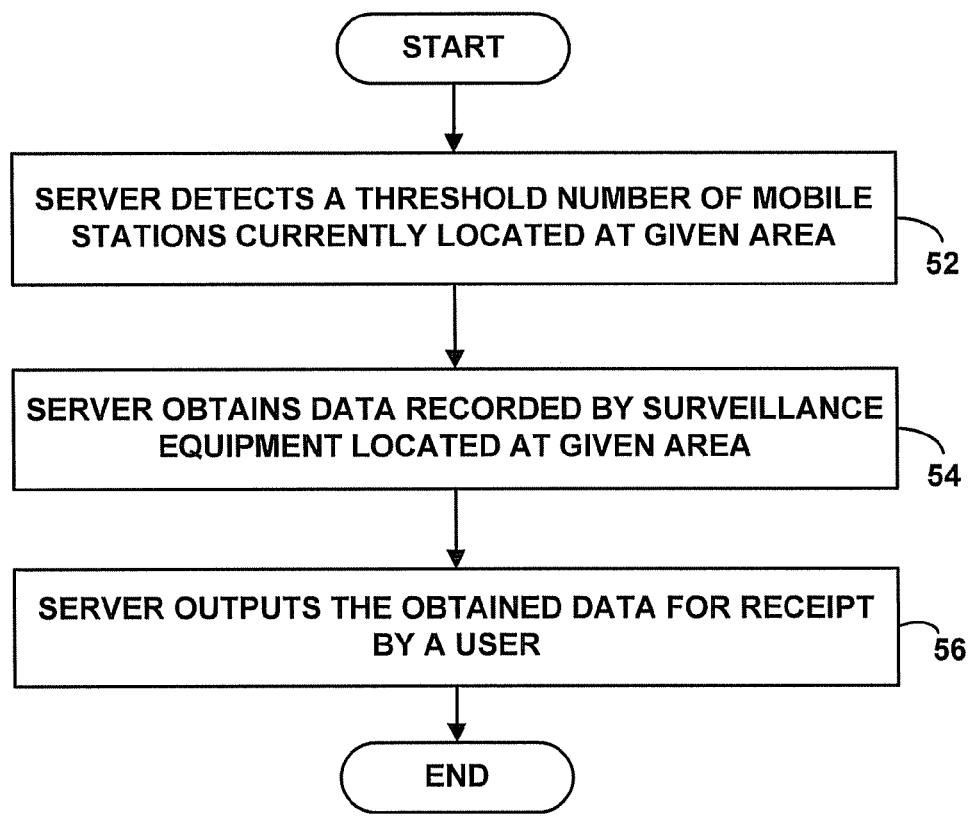
FIG. 2 is a flow chart depicting an exemplary method of monitoring activity at a given area.

FIG. 2 is a flow chart depicting an exemplary method of monitoring activity at the given area 14. At step 52, the central server 20 may detect a threshold number of mobile stations 12 located at the given area 14. In one example, the central server 20 may detect a threshold number of total mobile stations 12 located at the given area 14. In another example, the central server 20 may detect a threshold number of mobile stations 12 belonging to a predefined group that are located at the given area, such as a number of mobile stations 12 associated with criminals. In this respect, the central server 20 may first select a predefined group and identify the mobile stations 12 belonging to that predefined group, such as by referencing the data defining one or more predefined groups of mobile stations 12 stored in the database 21. The central server 20 may then monitor the number of the identified mobile stations 12 located in the given area 14.

To detect a threshold number of mobile stations 12 located at the given area 14, the central server 20 may first determine a number of mobile stations 12 currently located at the given area 14. In this respect, as described above, the central server 20 will preferably maintain data indicating the number of mobile stations 12 currently located in each area of interest (e.g., in the database 21), in which case the central server 20 will preferably determine the number of mobile stations 12 currently located at the given area 14 based on this maintained data. In particular, each time the central server 20 updates the maintained data indicating the number of mobile stations 12 currently located in the given area 14, the central server 20 will also preferably determine the number of mobile stations 12 currently located at the given area 14 based on the updated data. The central server 20 may update the maintained data indicating (and thus determine) the number of mobile stations 12 currently located at the given area 14 continuously, periodically (e.g., every 30 minutes), and/or in response to some triggering event (e.g., receiving a request from a user, receiving a notification from an access network entity). Further, the central server 20 will preferably work with access network entities, such as the RNC 34, the MSC 38, the HLR 40, the VLR 42, and/or the location system 44, to update the data indicating a number of mobile stations 12 currently located at the areas of interest, including the given area 14.

In one aspect, the central sever 20 may update the data indicating (and thus determine) a number of mobile stations 12 currently located in each area of interest based on notifications the central server 20 receives from access network entities, such as the RNC 34, the MSC 38, the HLR 40, the VLR 42, and/or the location system 44. In this respect, the access network entities may be arranged to send the central server 20 a notification when those entities identify a potential change in a mobile station's location. For example, the RNC 34 may send the central server 20 a notification each time the RNC 34 identifies a new mobile station 12 in a coverage area being served by the RNC 34. Similarly, the MSC 38 may send the central server 20 a notification each time the MSC 38 identifies a new mobile station 12 in a coverage area being served by the MSC 38. As another example, the HLR 40 may send the central server 20 a notification each time it updates a mobile station's location. As yet another example, a VLR 42 may send the central server 20 a notification each time a new mobile station 12 registers with the VLR 42. As a further example, the location system 44 may send the central server 20 a notification each time it determines a mobile station's location. In any of these examples, the notification may include at least an identifier of a mobile station 12 and an indication of the mobile station's location.

After receiving a notification indicating a location update for a given mobile station 12, the central server 20 may use the received notification to update the data indicating (and thus determine) a number of mobile stations 12 currently located in each area of interest. For instance, the central server 20 may compare the indication of the mobile station's location to the data defining the areas of interest (e.g., which may be stored in the database 21), to determine the area in which the mobile station is now located. Additionally, the central server 20 may compare the identifier of the mobile stations to data defining one or more predefined groups, to determine whether the mobile station 12 belongs to one or more predefined group. As a result of these comparisons, the central server 20 may then update the data indicating the mobile stations 12 that are currently located in each area of interest. At the same time, the central server 20 may determine the number of mobile stations 12 currently located in that area.

In another aspect, the central sever 20 may update the data indicating (and thus determine) the number of mobile stations 12 currently located in each area of interest by requesting and receiving data from access network entities, such as the RNC 34, the MSC 38, the HLR 40, the VLR 42, and/or the location system 44. In this respect, the central server 20 may request and receive data indicating the mobile stations 12 currently located in all areas of interest, or some subset thereof (e.g., only the given area 14).

Before requesting the data from the access network entities, the central server 20 may first identify which access network entities are serving the areas for which the central server 20 wishes to obtain data. In this respect, the central server 20 will preferably access, from the database 21, data indicating the access network entities serving the areas for which the central server 20 wishes to obtain data. The central server 20 may identify the access network entities using other techniques as well.

After identifying the access network entities serving the areas for which the central server 20 wishes to obtain data, the central server 20 may then request from one or more of those entities data that indicates the mobile stations 12 (e.g., total mobile stations 12 or mobile stations 12 belong to a predefined group) that are currently located in those areas. For example, the central server 20 may request and receive from the identified RNC(s) 34 data indicating the mobile stations 12 currently being served by the RNC(s) 34. Similarly, the central server 20 may request and receive from the identified MSC(s) 38 data indicating the mobile stations 12 currently being served by the MSC(s) 38. As another example, the central server 20 may request and receive from the identified HLR 40 data indicating the location of the mobile stations 12 in the access network 16. As yet another example, the central server 20 may request and receive from the identified VLR(s) 42 data indicating the mobile stations 12 currently registered at the identified VLR(s) 42. Other examples are possible as well. In each of these examples, the data received by the central server 20 will preferably include at least an identifier of each mobile station 12 and an indication of each mobile station's location (e.g., a coverage area identifier).

In addition to requesting and receiving the above data indicating the mobile stations 12 that are currently located in the areas for which the central server 20 wishes to obtain data, the central server 20 may also wish to obtain a higher precision indication of location for each mobile station 12. In this respect, after receiving the data from the other access network entities, the central server 20 may communicate with the identified location system(s) 44 to obtain a higher precision indication of location for each identified mobile station 12. For example, the central server 20 may send the identified location system(s) 44 an identifier of each mobile station 12 for which the central server 20 wishes to obtain a high precision indication of location. In turn, the identified location system(s) 44 may attempt to determine a high precision indication of location for those mobile stations 12, using any technique now known or later developed. The identified location systems 44 may then report back to the central server 20 the results of this process, which may take the form of a high precision indication of location and/or a low precision indication of location for each identified mobile station 12. Other examples for obtaining a high precision indication of location for these mobile stations 12 may exist as well.

After obtaining from the access network entities the data indicating the mobile stations 12 currently located in the areas for which the central server 20 wishes to obtain data, the central server 20 may then use that data to update the data indicating (and thus determine) the number of mobile stations 12 currently located in each area of interest. For instance, the central server 20 may compare received data indicating the mobile stations' locations to data defining the areas of interest (e.g., which may be stored in the database 21), to determine which mobile stations 12 are located in which areas of interest. Additionally, the central server 20 may compare the mobile stations' identifiers to data defining one or more predefined groups, to determine which mobile stations 12 belong to which predefined group(s). As a result of these comparisons, the central server 20 may then update the data indicating the mobile stations 12 that are currently located in each area of interest, such as by adjusting a numerical value for each area, updating the identifiers of the mobile stations 12 located in each area of interest, and/or updating the indications of locations of the mobile stations 12 located in each area of interest. At the same time, the central server 20 may determine the number of mobile stations 12 currently located in each area of interest.

Many other examples for updating the data indicating the number of mobile stations 12 currently located in the areas of interest and/or determining the number of mobile stations 12 currently located at the given area 14 may exist as well. Indeed, it should be understood that the techniques described above for updating the data indicating the number of mobile stations 12 currently located in each area of interest may similarly be used to determine the number of mobile stations 12 currently located in given area 14 without reference to maintained data.

After determining the number of mobile stations 12 currently located at the given area 14, the central server 20 may then determine that the number of mobile stations 12 currently located at the given area 14 is greater than (or equal to) the threshold number of mobile stations 12 located at the given area 14, where the threshold number represents a desired maximum number of mobile stations 12 located at the given area 14. Additionally or alternatively, the central server 20 may determine that the number of mobile stations 12 currently located at the given area 14 is less than (or equal to) the threshold number of mobile stations 12 located at the given area 14, where the threshold number represents a desired minimum number of mobile stations 12 located at the given area 14. In either case, the central server 20 will preferably select the threshold number for the given area 14 (e.g., from the database 21) based on various criteria, and the central server 20 may then compare the determined number of the mobile stations 12 currently located at the given area 14 to that threshold number.

For example, if the central server 20 is monitoring the number of total mobile stations 12 currently located in the given area 14, the central server 20 may select a threshold number that represents a desired maximum or minimum number of total mobile stations 12 located at the given area 14. As another example, if the central server 20 is monitoring the number of mobile stations 12 belonging to a predefined group that are currently located in the given area 14, the central server 20 may select a threshold number that represents a desired maximum or minimum number of mobile stations 12 belonging to the predefined group that are located at the given area 14. In either case, the central server 20 may select a threshold number for the given area 14 that represents the desired maximum or minimum number of mobile stations 12 located at the given area 14 at any time, regardless of the time period during which the central server 20 is carrying out the method. Alternatively, the central server 20 may select a threshold for the given area that represents the desired maximum or minimum number of mobile stations 12 located at the given area 14 during a particular time period. In this respect, the central server 20 may first identify the time period during which it is determining the number of mobile stations 12, and the central server 20 may then use the identified time period to select the threshold for the given area 14. Other examples for selecting the threshold number and/or determining that the number of mobile stations 12 currently located at the given area 14 is greater than or less than the threshold number may exist as well.

At step 54, in response to detecting the threshold number of mobile stations 12 located at the given area 14, the central server 20 may then obtain data recorded by surveillance equipment 22 located at the given area 14, where the data represents activity at the given area 14. In this respect, the central server 20 may first identify the surveillance equipment entities 22 located at the given area 14, such as by referencing the data defining the surveillance equipment 22 stored in the database 21. The central server 20 may then generate and send a request for data recorded by one or more surveillance equipment 22 located at the given area 14. This request may take various forms. For example, the request may specify the type of data (e.g., video, audio, etc.) that the central server 20 wishes to receive from the surveillance equipment 22. In another example, the request may specify the surveillance equipment entities 22 from which the central server 20 wishes to receive data (e.g., video cameras, still cameras, microphones including those embedded in mobile stations 12, data storage devices, serves, etc.). In yet another example, the request may specify the time frame from which the central server 20 wishes to receive data (e.g., previously recorded data, real-time data, etc.). Other examples are possible as well, including the possibility that the request includes multiple request messages to different entities. When generating this request, the central server 20 will preferably reference the data defining the surveillance equipment 22 stored in the database 21.

While requesting data recorded by the surveillance equipment entities 22 located at the given area 14, the central server 20 may also instruct surveillance equipment entities 22 located at the given area 14 to begin recording data. For example, the central server 20 may send a separate instruction message along with the request message. In this respect, when generating the instruction message, the central server 20 may reference the data defining the surveillance equipment 22 to determine which surveillance equipment entities 22 are idle (i.e., not currently recording data). The central sever 20 may then identify these idle surveillance equipment entities 22 in the instruction message. Additionally, the central server 20 may include operating parameters for these idle surveillance equipment entities 22 (e.g., the duration of capture, the type of data to capture, the format of the recorded data, etc.).

In another example, the central server's request for data recorded by the surveillance equipment 22 located at the given area 14 may additionally serve as an instruction for surveillance equipment entities 22 to begin recording data. In this respect, as above, the central server 20 may reference the data defining the surveillance equipment 22 to determine which surveillance equipment entities 22 are idle. The central server 20 may then explicitly indicate in the request which idle surveillance equipment entities 22 are instructed to begin recording data. Alternatively, the central server 20 may simply identify in the request the surveillance equipment entities 22 from which the central server 20 wishes to obtain data, in which case that identification will serve as the instruction to begin recording data for the idle surveillance equipment entities 22. Other methods for instructing surveillance equipment entities 22 to begin recording data while requesting data recorded by the surveillance equipment entities 22 may exist as well.

After the central server 20 sends the request, one or more entities located at the given area 14, including the gateway 24 and/or the surveillance equipment 22 identified in the request, may receive the request. In one aspect, the gateway 24 located at the given area 14 may process the central server's request and communicate with surveillance equipment entities 22 identified in the request to obtain the requested data. In particular, the gateway 24 may receive the request from the central server 20 via the backhaul link 28. Based on the request, the gateway 24 may determine the surveillance equipment entities 22 from which it needs to obtain data. If necessary, the gateway 24 may instruct those surveillance equipment entities 22 to begin recording data. The gateway may then obtain the requested data from the surveillance equipment entities 22, such as by requesting and receiving the data from the surveillance equipment entities 22. In this respect, the gateway 24 may communicate with the surveillance equipment entries 22 according to different protocols, depending on the protocols supported by those surveillance equipment entities 22. After obtaining the data from surveillance equipment entities 22, the gateway 24 may also perform any necessary processing on the obtained data.

In another aspect, the surveillance equipment entities 22 identified in the request may process the request. In this respect, the identified surveillance equipment entities 22 may receive the central server's request via the backhaul link 28 and the gateway 24, which may simply pass the request to the surveillance equipment entities 22 without performing processing. Alternatively, the identified surveillance equipment entities 22 may receive the request from the central server 20 over a path that does not include the gateway 24. For example, the surveillance equipment 22 may include one or more entities that are connected directly to the data network 18. As another example, the surveillance equipment 22 may include one or more entities that communicate via a wireless protocol and thus couple to the data network 18 via the access network 16. Other examples are possible as well.

After an identified surveillance equipment entity 22 receives a request from the gateway 24 and/or the central server 20, the entity 22 may first determine whether the request includes an instruction to begin recording data. If so, and the surveillance equipment entity 22 is currently idle, the entity 22 may responsively begin recording data. The surveillance equipment entity 22 may then identify which of its recorded and/or stored data is being requested. In turn, the surveillance equipment entity 22 may prepare the requested data for transmission to the gateway 24 and/or the central server 20, such as by making a copy of the requested data and/or processing the data. The surveillance equipment entity 22 may also perform other functions in response to a request for data.

Once the gateway 24 and/or the identified surveillance equipment entities 22 have received and processed the central server's request, the gateway 24 and/or the identified surveillance equipment entities 22 may begin sending, and the central server 20 may begin receiving, the requested data. In this respect, if the requested data includes only data that the surveillance equipment entities 22 recorded before the request (i.e., previously-recorded data), the gateway 24 and/or the identified surveillance equipment entities 22 may send the previously-recorded data to the central server 20 according any packet-data protocol, and may then cease communication with the central server 20 after the transmission of the previously-recorded data is complete. Alternatively, if the requested data includes data that is currently being recorded by the surveillance equipment entities 22 (i.e., real-time data), the gateway 24 and/or the identified surveillance equipment entities 22 may send the data to the central server 20 according to a steaming media protocol, and may continue recording and sending data to the central server 20 indefinitely. Other methods for sending the requested data to the central server 20 may exist as well.

As indicated above, in one aspect of the exemplary method, the surveillance equipment 22 may include one or more mobile stations 12 located at the given area 14. In this respect, the central server 20 may temporarily transform the one or more mobile stations 12 into surveillance equipment 22. In particular, the central server 20 may send via the access network 16, and a mobile station 12 at the given area 14 may thus receive, a request for data recorded by the mobile station 12. Preferably, this request will be accompanied by and/or serve as an instruction to begin recording data. In turn, the mobile station 12 may begin recording data that represents activity at the given location 14. For example, the mobile station 12 may enable a microphone embedded therein and begin recording audio data via the microphone that represents activity at the given area 14. The mobile station 12 may then send via the access network 16, and the central server 20 may thus receive, the recorded data. Preferably, the mobile station 12 will carry out this process without providing any notification to a user. Advantageously, by temporarily transforming a mobile station 12 at the given area 14 into surveillance equipment 22, the central server 20 may be able to monitor activity at the given area 14 that the other surveillance equipment entities 22 may not be able to capture.

After the central server 20 begins obtaining the data recorded by the surveillance equipment 22 located at the given area 14, the central server 20 may take additional action with respect to that data. For example, at step 56, the central server 20 will preferably output the obtained data for receipt by a user (e.g., a surveillance operator), who may either be at the same location as the central server 20 or at a remote location. If the user is at the same location, the central server 20 may output the data via a user interface, such as by displaying the data as video and/or playing the data out as audio. If the user is at a remote location, the central server 20 may send the data to an entity with access to a user interface at the remote location, and that entity may output the data for receipt by the user. Other examples for outputting the data may exist as well. While outputting the data, the central server 20 may additionally alert the user to the importance of the data, such as by sounding an audible alarm or enabling a flashing light. As another example, the central server 20 may analyze the obtained data in an attempt to characterize the activity represented by the data. The central server 20 may take other actions with respect to the obtained data as well.

The central server 20 may also trigger other security measures in response to detecting the threshold number of mobile stations 12 located at the given area 14. For example, in response to detecting the threshold number of mobile stations 12 currently located at the given area 14, the central server 20 may alert law enforcement agencies associated with the given area 14 that unwanted activity may be occurring. As another example, in response to detecting the threshold number of mobile stations 12 located at the given area 14, the central server 20 may institute a warning at the given area 14 that unwanted activity may be occurring, such as by playing out an audio warning over a loudspeaker. As still another example, in response to detecting the threshold number of mobile stations 12 located at the given area 14, the central server 20 may cause lights at the given area 14 to be powered on. The central server 20 may also trigger other security measures and/or take other actions in response to detecting the threshold number of mobile stations 12 located at the given area 14 as well. Additionally or alternatively, the central server 20 may trigger security measures in response to identifying unwanted activity during analysis of the obtained data.

Figure 3:
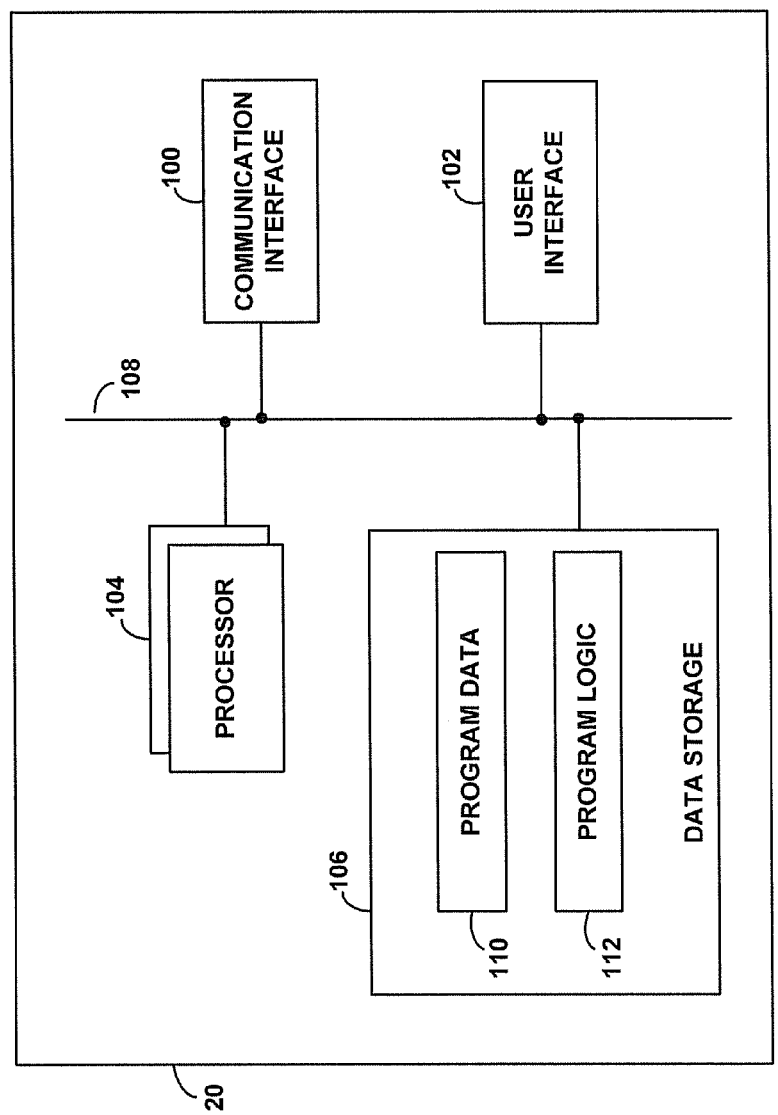
FIG. 3 is a simplified block diagram showing functional components of an exemplary server capable of carrying out the exemplary method of FIG. 2.

FIG. 3 is a simplified block diagram showing functional components of an exemplary server 20 capable of carrying out the exemplary method of FIG. 2. As shown in FIG. 3, the exemplary server 20 may include a communication interface 100, a user interface 102, a processor 104, and data storage 106, all linked together via a system bus, network, or other connection mechanism 108.

The communication interface 100 preferably functions to communicatively couple the exemplary server 20 to the access network 16 (e.g., via the data network 18 and the gateway 36) and the surveillance equipment 22 located at the given area 14 (e.g., via the data network 18, the backhaul link 28 and the gateway 24). Additionally, if the database 21 is external to the exemplary server 20, the communication interface 100 may communicatively couple the exemplary server 20 to the database 21. The communication interface 100 may take the form of an Ethernet network interface card, a chipset and antenna adapted to facilitate wireless communication according to a desired protocol, and/or any other form that provides for wired and/or wireless communication with the access network, the surveillance equipment 22, and/or the database 21. Preferably, the communication interface 100 will be a T1/E1 interface. The communication interface 100 may also include multiple communication interfaces, such as one through which the exemplary server 20 communicates with the access network and one through which the exemplary server 20 communicates with the surveillance equipment 22. Other configurations are also possible.

The user interface 102 preferably functions to facilitate user interaction (e.g., surveillance operator interaction) with the server 20. The user interface 102 may include a visual interface, a manual interface and/or an audio interface. The visual interface may include a display screen for providing a visual output of data to a user. The manual interface may include various components for facilitating manual user input, such as a keyboard, a mouse, a multi-functional button, a navigation pad, and/or a scroll wheel. The audio interface may include a speaker for outputting audio signals and a microphone for receiving user speech. The user interface 102 may also include signal processing components, such as A-D and D-A circuitry.

The processor 104 may comprise one or more general purpose microprocessors and/or dedicated signal processors. (The term "processor" encompasses either a single processor or multiple processors that could work in combination.) Data storage 106, in turn, may comprise memory and/or other storage components, such as optical, magnetic, organic or other memory or disk/disc storage, which can be volatile and/or non-volatile, internal and/or external, and integrated in whole or in part with the processor 104. Data storage 106 preferably contains or is arranged to contain (i) program data 110 and (ii) program logic 112. Although these components are described herein as separate data storage elements, the elements could just as well be physically integrated together or distributed in various other ways. In a preferred example, the program data 110 would be maintained in data storage 106 separate from the program logic 112, for easy updating and reference by the program logic 112.

In a preferred example, data storage 106 comprises the database 21 described above. In this respect, program data 110 may contain the data described above with reference to the database 21, including the data defining the areas of interest, the data indicating the access network entities serving each area of interest, the data indicating the surveillance equipment 22 located at each area of interest, and/or the data indicating a number of mobile stations 12 located in each area of interest. In another example, data storage 106 may be separate from the database 21. In this respect, program data 110 may contain a subset of the data described above with reference to the database 21. Additionally, program data 110 may contain other data related to the operation of the exemplary server 20, such as data defining one or more predefined groups of mobile stations 12 and/or data defining one or more particular time periods.

Program logic 112 preferably comprises machine-language instructions that may be executed or interpreted by processor 104 to carry out functions in accordance with the exemplary method described in FIG. 2. It should be understood, however, that the program logic 112 and its associated functions are described herein by way of example only. As such, those skilled in the art will appreciate that other program logic and/or functions may be used instead, some program logic and/or functions may be added, and some program logic and/or functions may be omitted altogether. Further, as noted above, the various functions described herein can be embodied in software, hardware, and/or firmware.

For example, the program logic 112 may be executable by the processor 104 to (a) detect a threshold number of mobile stations 12 (e.g., total mobile stations 12 and/or mobile stations belong to a predefined group) located at the given area 14 and (b) obtain data recorded by surveillance equipment 22 located at the given area 14, including mobile stations 12 located at the given area 14, in response to detecting the threshold number of mobile stations 12 currently located at the given area 14. In this respect, the program logic 112 may be executable by the processor 104 to determine that the number of mobile stations 12 currently located at the given area 14 is greater than a threshold number that represents a desired maximum number of mobile stations 12 located at the given area 14 and/or less than a threshold number that represents a desired minimum number of mobile stations 12 located at the given area 14.

As another example, the program logic 112 may be executable by the processor 104 to maintain (and update) data indicating the number of mobile stations 12 located at the given area 14, including historical data indicating a typical number of mobile stations 12 located at the given area 14, data indicating a threshold number of mobile stations 12 located at the given area 14, and data indicating a number of mobile stations 12 currently located in each area of interest. As yet another example, the program logic 112 may be executable by the processor 104 to take additional action in response to detecting the threshold number of mobile stations 12 currently located at the given area 14, such as outputting the obtained data and/or notifying a law enforcement agency associated with the given area. The program logic 112 may be executable by the processor 104 to perform various other functions as well.

Exemplary embodiments have been described above. Those skilled in the art will understand, however, that changes and modifications may be made to the embodiments described without departing from the true scope and spirit of the present invention, which is defined by the claims.

We claim:

1. A method of monitoring activity at a given area, the method comprising:
   maintaining, at one or more servers, historical data indicating a number of mobile stations previously located at the given area;
   defining a threshold number of mobile stations located at the given area based on the historical data;
   detecting the threshold number of mobile stations located at the given area;
   in response to detecting the threshold number of mobile stations located at the given area, sending a request for data recorded by surveillance equipment located at the given area, wherein the data represents activity at the given area; and
   as a result of sending the request, receiving data recorded by the surveillance equipment.

2. The method of claim 1, wherein the surveillance equipment comprises a digital video camera and the data comprises digital video.

3. The method of claim 1, wherein the surveillance equipment comprises a microphone and the data comprises audio.

4. The method of claim 1, wherein the data recorded by the surveillance equipment comprises data that was previously recorded by the surveillance equipment.

5. The method of claim 1, wherein the data recorded by the surveillance equipment comprises real-time data.

6. The method of claim 1, wherein the threshold number represents a desired maximum number of mobile stations located at the given area, and wherein detecting the threshold number of mobile stations located at the given area comprises:

determining a number of mobile stations currently located at the given area; and determining that the number of mobile stations currently located at the given area is greater than the threshold number.

7. The method of claim 1, wherein the threshold number represents a desired minimum number of mobile stations located at the given area, and wherein detecting the threshold number of mobile stations located at the given area comprises:

determining a number of mobile stations currently located at the given area; and determining that the number of mobile stations currently located at the given area is less than the threshold number.

8. The method of claim 1, wherein the historical data indicating a number of mobile stations previously located at the given area comprises historical data indicating a number of mobile stations previously located at the given area during a particular time period.

9. The method of claim 1, wherein the mobile stations consist of mobile stations belonging to a predefined group.

10. The method of claim 9, wherein the mobile stations in the predefined group comprise mobile stations associated with criminals.

11. The method of claim 1, wherein the request for data recorded by surveillance equipment located at the given area comprises an instruction for the surveillance equipment to begin recording data.

12. The method of claim 1, further comprising:

outputting the obtained data for receipt by a user.

13. The method of claim 1, further comprising:

in response to detecting the threshold number of mobile stations located at the given area, alerting a law enforcement agency.

14. A method of monitoring activity at a given area, the method comprising:

maintaining, at one or more servers, historical data indicating a number of mobile stations previously located at the given area;

defining a threshold number of mobile stations located at the given area based on the historical data;

detecting the threshold number of mobile stations located at the given area;

in response to detecting the threshold number of mobile stations located at the given area, sending a request for data recorded by one or more mobile stations located at the given area, wherein the data represents activity at the given area; and as a result of sending the request, receiving data recorded by the one or more mobile stations.

15. The method of claim 14, wherein the request for data recorded by one or more mobile stations located at the given area comprises an instruction for the one or more mobile stations to begin recording data.

16. A server comprising:

a communication interface for communicating with an access network and surveillance equipment located at a given area;

a processor;

data storage; and program instructions stored in the data storage and executable by the processor for:

maintaining historical data indicating a number of mobile stations previously located at the given area;

defining a threshold number of mobile stations located at the given area based on the historical data;

detecting the threshold number of mobile stations located at the given area; and in response to detecting the threshold number of mobile stations located at the given area, obtaining data recorded by surveillance equipment located at the given area, wherein the data represents activity at the given area.

17. The server of claim 16, further comprising a user interface for outputting the obtained data.

18. The server of claim 16, wherein the data storage contains:

data defining the given area;

data indicating entities in the access network that serve the given area;

data indicating surveillance equipment located at the given area; and data indicating a number of mobile stations located at the given area.

* * * * *